(12) United States Patent
Ishii

(10) Patent No.: US 7,322,003 B2
(45) Date of Patent: Jan. 22, 2008

(54) INFORMATION STORAGE DEVICE

(75) Inventor: Koji Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 11/064,412

(22) Filed: Feb. 23, 2005

(65) Prior Publication Data

US 2006/0107177 A1     May 18, 2006

(30) Foreign Application Priority Data

Oct. 28, 2004   (JP)  ............................ 2004-314273

(51) Int. Cl.
*G11C 29/00* (2006.01)
(52) U.S. Cl. .................................................. 714/769
(58) Field of Classification Search ................. 714/769
See application file for complete search history.

(56) References Cited

U.S. PATENT DOCUMENTS 5,793,724 A * 8/1998 Ichikawa et al. ........ 369/47.31
6,043,946 A * 3/2000 Genheimer et al. ........... 360/53
6,119,261 A    9/2000 Dang et al. .................. 714/769
6,697,989 B1 * 2/2004 Maeda et al. ................ 714/755
7,131,052 B2  10/2006 Hassner et al. .............. 714/787
7,171,607 B2   1/2007 Tsunoda ...................... 714/765
2005/0050425 A1* 3/2005 Matsuda et al. ............. 714/755

FOREIGN PATENT DOCUMENTS

| JP | 6-202819 | 7/1994 |
| JP | 9-259532 | 10/1997 |
| JP | 2003-199793 | 7/2003 |

* cited by examiner

*Primary Examiner*—Shelly Chase
(74) *Attorney, Agent, or Firm*—Greer, Burns & Crain, Ltd.

(57) ABSTRACT

A control unit transfers user data and an ECC that are read from a magnetic disk and stored in an FIFO to a data buffer. An erasure position movement control unit shifts an erasure start position from a predetermined initial value at predetermined intervals of erasure movement step, and an erasure position designating unit determines an erasure correcting position based upon the erasure start position and a predetermined erasure length. An ECC processing unit performs error correction by an ECC arithmetic processing in an erasure mode on the user data and the ECC in the data buffer.

5 Claims, 12 Drawing Sheets

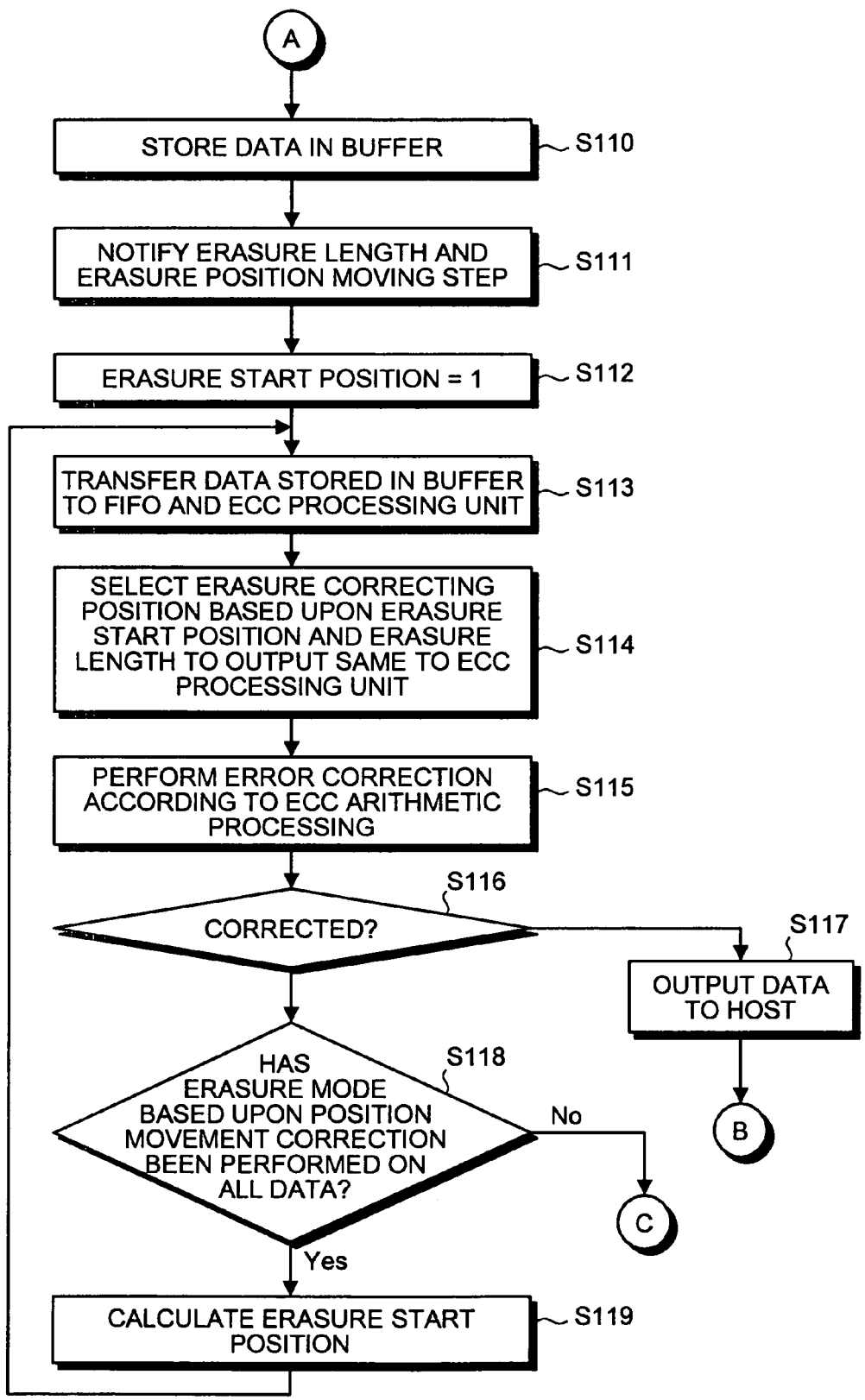

INFORMATION STORAGE DEVICE

BACKGROUND OF THE INVENTION

1) Field of the Invention

The present invention relates to a technology for reading of data stored in a recording medium, and more particularly to a technology for reading data stored in a recording medium and correcting an error in the data read.

2) Description of the Related Art

An information storage device that reads and writes information (data) from and to a recording medium, such as a magnetic disk and an optical disk, is used as a storage device for various systems, such as a personal computer and a server.

When an information storage device receives a write instruction from a host, such as a personal computer and a server, to record data in a recording medium, the information storage device modulates data to be recorded using a predetermined modulation system, and stores the data, which is modulated, in the recording medium. When the information storage device receives a read instruction from the host to read data from the recording medium, the information storage device demodulates the data to be read using a predetermined demodulation system, and outputs the data, which is demodulated, to the host. Sometimes during such reading process, a flaw on the recording medium causes an error in the data. Therefore, the information storage device generally adds, at writing of the data, an error correcting code (ECC) for correcting such error in advance to perform error correction on the data that is read.

On the other hand, in the various systems, speedup of processing is demanded. Therefore, speedup is also required regarding data reading from the information storage device, and various techniques have been proposed.

For example, in a conventional technology disclosed in Japanese Patent Application Laid-Open No. H6-202819, a disk device performs, after reading data from a recording medium and storing the data in a buffer memory, error correction on the data while reading the data. The disk device transmits the data of which an error is corrected to a host without writing the data again in the buffer memory. Specifically, an optical disk controller controls an optical disk driving unit via an enhanced small device interface (ESDI) unit to read information recorded on an optical disk. The optical disk controller transfers user data in the information to the buffer memory and an error detecting unit. Then, the optical disk controller transfers the ECC included in the information to the error detecting unit. The optical disk controller reads user data stored in the buffer memory one byte by one byte to transfer the user data to a small computer system interface (SCSI) controller. The error detecting unit detects a bit error in the user data based on the ECC, and sequentially transfers error information that indicates positions of the bit errors to the SCSI controller one byte by one byte. The SCSI controller corrects the bit error based upon the error information and temporarily stores the user data corrected in a first-in first-out (FIFO) circuit. The SCSI controller then outputs the user data stored to the host without writing the user data corrected again in the buffer memory.

There are two modes for the error correction based on the ECC. One is an on-the-fly mode and the other is an erasure mode. In the on-the-fly mode, a position of an error in data is detected based on the ECC, and a piece of data at the position detected is corrected. In the erasure mode, a position of an error in data is designated, and a piece of data at the position designated is corrected.

In the on-the-fly mode, ECC constituted of two symbols is required for correcting data constituted of one symbol, and in the erasure mode ECC constituted of one symbol is required for correcting data constituted of one symbol. For example, when a total number of symbols constituting data and ECC in one data sector is represented as n and the ECC is constituted of four symbols, error correction on data constituted of two symbols can be made in the on-the-fly mode, while error correction on data constituted of four symbols can be made in the erasure mode. In other words, in a data sector having data constituted of (n−4) symbols and ECC constituted of four symbols, when an error occurs in data constituted of three or more symbols, the data can not be corrected in the on-the-fly mode, and when an error occurs in data constituted of five symbols, the data can not be corrected in the erasure mode.

In the above conventional technology, when the error correction can not be successfully performed by an arithmetic processing based on the ECC, it is necessary to read out the information from the optical disk again. Therefore, much time is required for the error correction.

In a magnetic disk device for which a magnetic disk, in which information is recorded using magnetism, as a recording medium, when an error position can be identified by thermal asperity (TA), the error correction can be conducted in the erasure mode. However, it is impossible to identify a position of an error on data due to a failure in the magnetic disk. Therefore, the error correction in the on-the-fly mode can only be performed, resulting that a correction length can not be elongated.

If the error correction in the erasure mode is performed to elongate the correction length, it is necessary to vary a position at which the error correction in the erasure mode is performed since the position of an error can not be identified. Therefore, until the position of the error matches the position at which the error correction is performed, the information is read from the magnetic disk for many times, consuming a lot of time for the error correction.

SUMMARY OF THE INVENTION

It is an object of the present invention to solve at least the above problems in the conventional technology.

An information storage device according to one aspect of the present invention reads data that includes user data and an error correcting code (ECC), which is used for error correction in which an error in the data is corrected, from a recording medium, performs the error correction on the data by an ECC arithmetic processing, and retries the error correction when the error is not successfully corrected by the ECC arithmetic processing. The information storage device includes a first buffer that stores the data read from the recording medium; a second buffer that stores the data stored in the first buffer; an erasure control unit that selects, at each time of retry of the error correction, an erasure correcting position at which erasure correction is carried out in the data by the ECC arithmetic processing; an ECC processing unit that performs the error correction by performing the ECC arithmetic processing on the data in the first buffer in an erasure mode at the position selected, and performs correction to the data in the second buffer in a same manner as the data in the first buffer; and a control unit that transfers the data in the first buffer to the second buffer and the ECC processing unit when the data is not corrected by the ECC processing unit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 10B is a flowchart of an operation of the magnetic disk device according to the first embodiment;

DETAILED DESCRIPTION

Exemplary embodiments of the present invention will be explained below in detail with reference to the accompanying drawings. The present invention is not limited to these embodiments.

Figure 1:
FIG. 1 is a schematic of a data sector that is recorded on a recording medium.

FIG. 1 is a schematic of a data sector that is recorded on a recording medium. As shown in FIG. 1, the data sector includes a phase locked loop (PLL) section 60, a sync byte (SB) section 61, a user data section 62, a cyclic redundancy check (CRC) section 63, and an ECC section 64.

In the PLL section 60, information for carrying out phase synchronization and for fixing an output when an information storage device reads the data sector from a recording medium is stored. In the SB section 61, synchronization information is stored. The synchronization information indicates that data is stored hereafter. In the user data section 62, user data is to be stored. In the CRC section 63, address information of the recording medium is stored. In the ECC section 64, a code that is required for error correction by an ECC arithmetic processing, which is the ECC, is stored. The constitution of the sector is not limited to that of the data sector shown in FIG. 1. For example, two SB sections 61 may be provided, although the user data section 62 and the ECC section 64 are essential.

Figure 2:
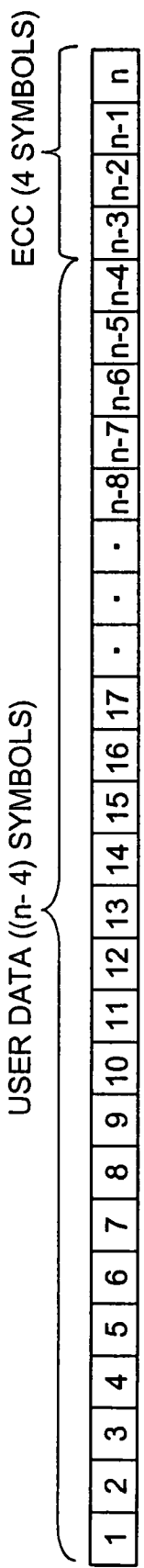
FIG. 2 is a schematic of symbols to which error correction by an ECC arithmetic processing is performed.

FIG. 2 is a schematic of symbols to which the error correction by the ECC arithmetic processing is performed. As shown in FIG. 2, the user data and the ECC in the data sector shown in FIG. 1 is constituted of n symbols, where 7<n, n is a positive integer. It is assumed that the ECC is constituted of four symbols and the user data is constituted of (n−4) symbols.

Figure 3:
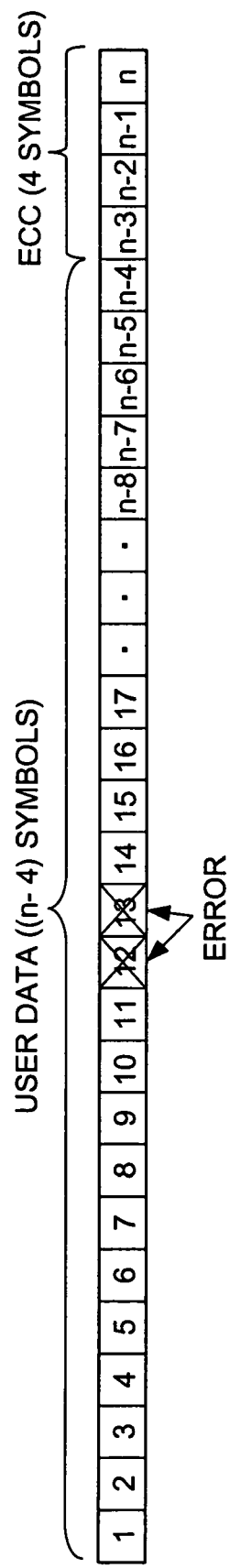
FIG. 3 is a schematic of an error of two symbols in data.
Figure 4:
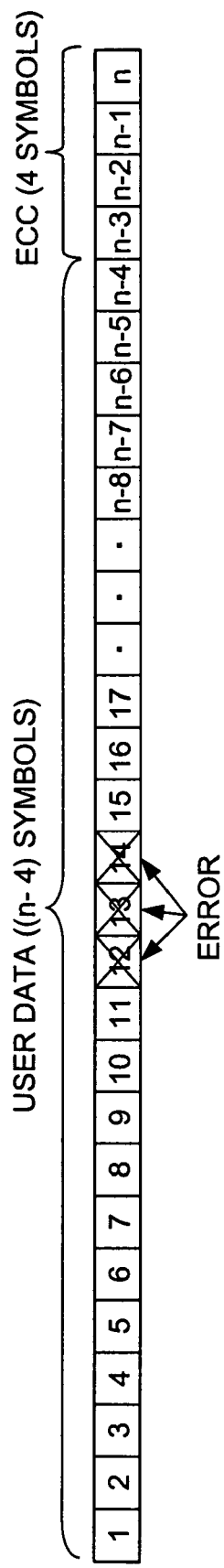
FIG. 4 is a schematic of an error of three symbols in data.

In the on-the-fly mode, the error correction can be performed on a half the number of symbols among the symbols constituting the ECC. Therefore, when the ECC is constituted of four symbols, data error within two symbols can be corrected. That is, as shown in FIG. 3, when errors occur in a twelfth symbol and a thirteenth symbol, these errors can be corrected. However, as shown in FIG. 4, errors occur in three symbols from the twelfth symbol to a fourteenth symbol, the error correction can not be conducted.

Figure 5:
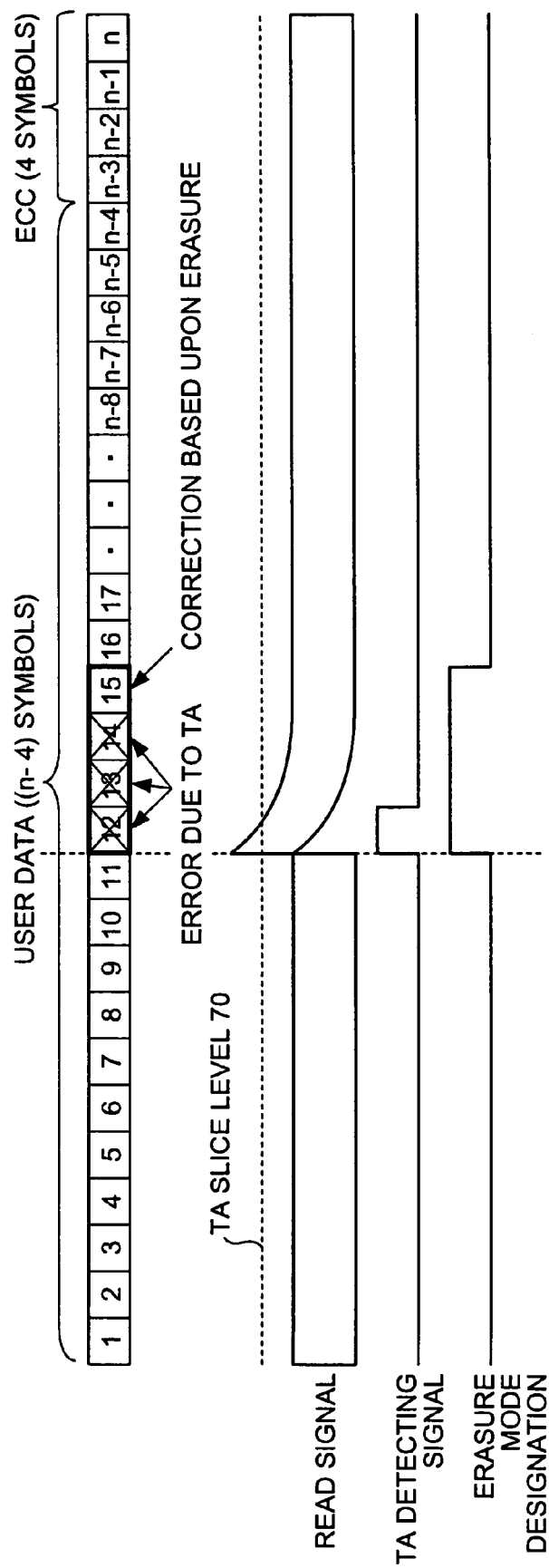
FIG. 5 is a schematic for explaining a case in which the error of three symbols occurs in data due to a thermal asperity.

On the other hand, in the erasure mode, it is necessary to designate a position, at which an error occurs, in advance of the error correction, but the error correction can be performed on the same number of symbols as the number of symbols constituting ECC. In an information storage device (a magnetic disk device) using a magnetic disk as the recording medium, a burst error may occur in a read signal because of noise on pulses called thermal asperity (TA), when the magnetic disk and a magnetic head contact with each other due to an environmental change such as a temperature change or a pressure change. In that case, as shown in FIG. 5, a TA is detected based upon determination whether a level of the read signal exceeds a TA slice level 70, and a TA detecting signal is asserted (H in this case). When the TA detecting signal is asserted, an erasure mode designation is turned on ("H" in this case), four symbols from a position at which the TA detecting signal is asserted (the twelfth symbol in this case) is designated as an erasure correcting position, and the error correction by the ECC arithmetic processing is performed. Thus, the error correction can be performed on the three symbols (the twelfth to fourteenth symbols) having the errors due to the TA.

Figure 6:
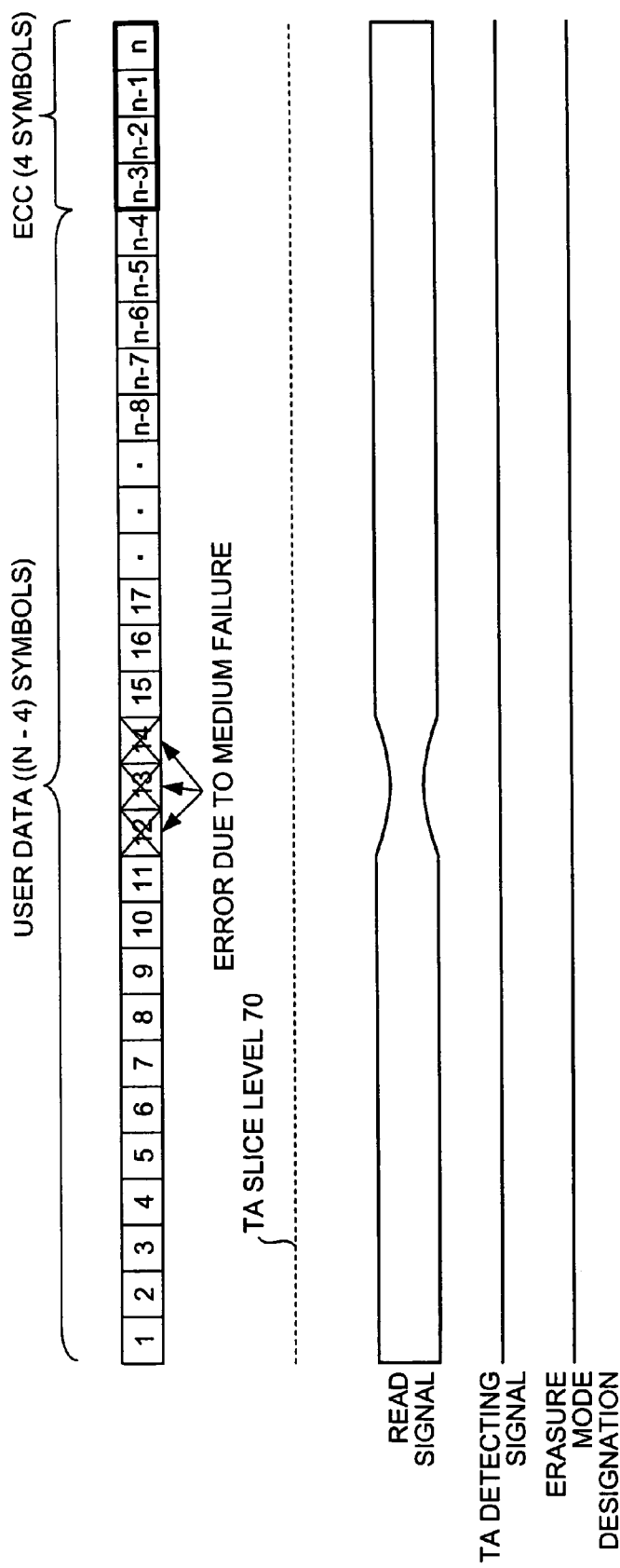
FIG. 6 is a schematic for explaining a case in which the error of three symbols occurs in data due to a medium failure.

However, when an error occurs due to a medium failure caused by a flaw or the like, the TA detecting signal is not asserted as shown in FIG. 6 since a level of a read signal does not exceed the TA slice level 70. Therefore, even with the TA detecting signal, a position of the error can not be detected. That is, an error occurring due to the medium failure can not be corrected by a method using the TA slice level 70 to detect the error position to actuate the erasure mode.

Figure 7:
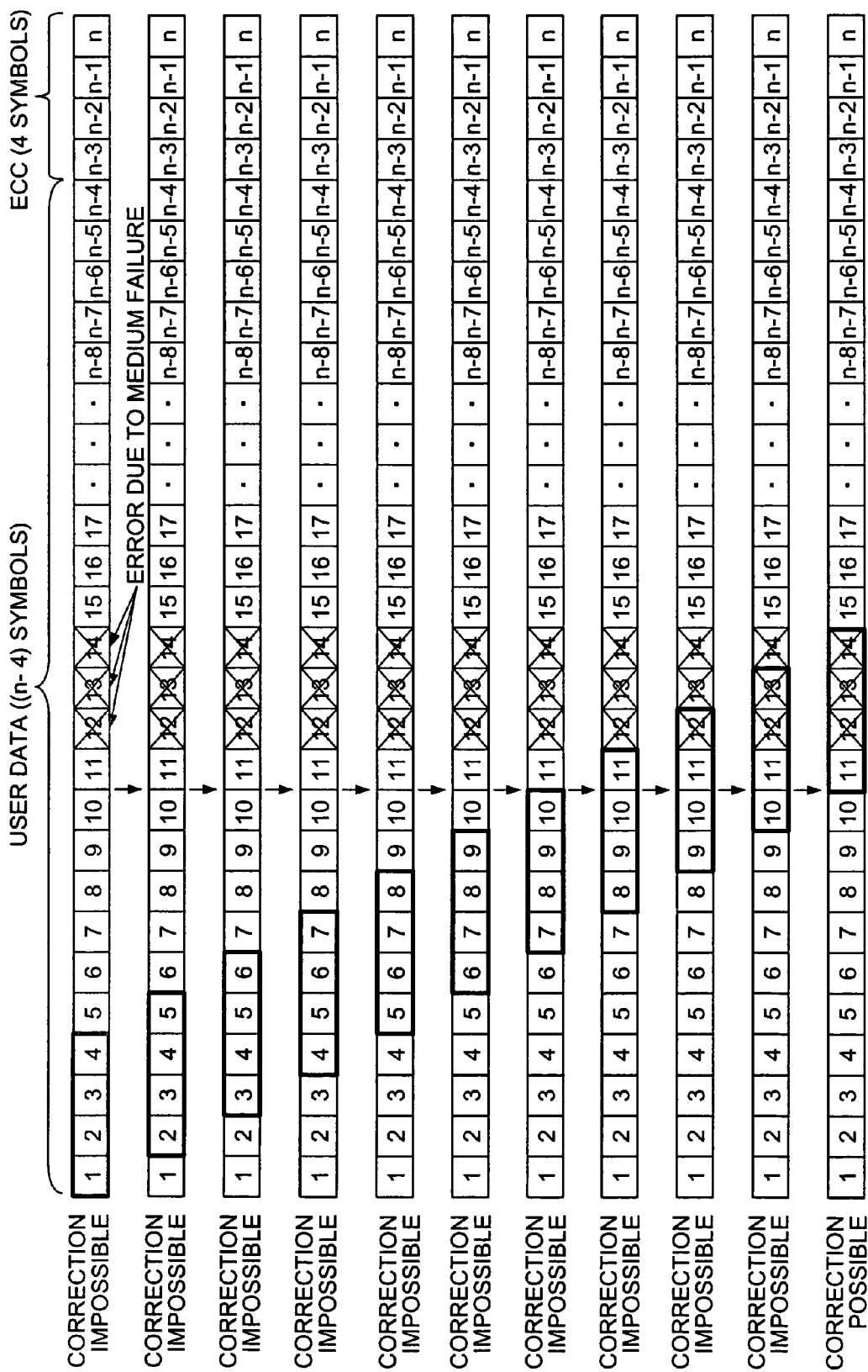
FIG. 7 is a schematic for explaining a procedure of shifting a position at which erasure correction is performed.

When errors occur at three symbols from the twelfth symbol to the fourteenth symbol, and when the ECC is constituted of four symbols, the error correction can not be achieved even in the on-the-fly mode. However, since the errors are in three symbols, if the positions of the errors are identified, the errors can be corrected in the erasure mode setting the positions identified as the erasure correcting positions. As shown in FIG. 7, the erasure correcting positions of symbols (four symbols), which are correctable number of symbols in the erasure mode, are sequentially shifted one symbol by one symbol, such as the first to fourth symbols, the second to fifth symbols, the third to sixth symbols, and so on, and when the erasure correcting positions reach the eleventh to fourteenth symbols, the errors of the twelfth to fourteenth symbols due to the medium failure can be corrected.

As shown in FIG. 7, however, when data is read from the recording medium for each one of sequential designations for the erasure positions (each time the error correction is retried), although the data correction can be achieved, enormous time is required for the data correction. In view of such problem, an information storage device according to an embodiment of the present invention stores data read from the recording medium in a data buffer, and reads the data from the data buffer at each time of retrying the error correction, instead of reading the data from the recording medium again. Thus, the error correction can be carried out at a high speed in the erasure mode while shifting the erasure correcting positions using the data stored in the data buffer.

Figure 8:
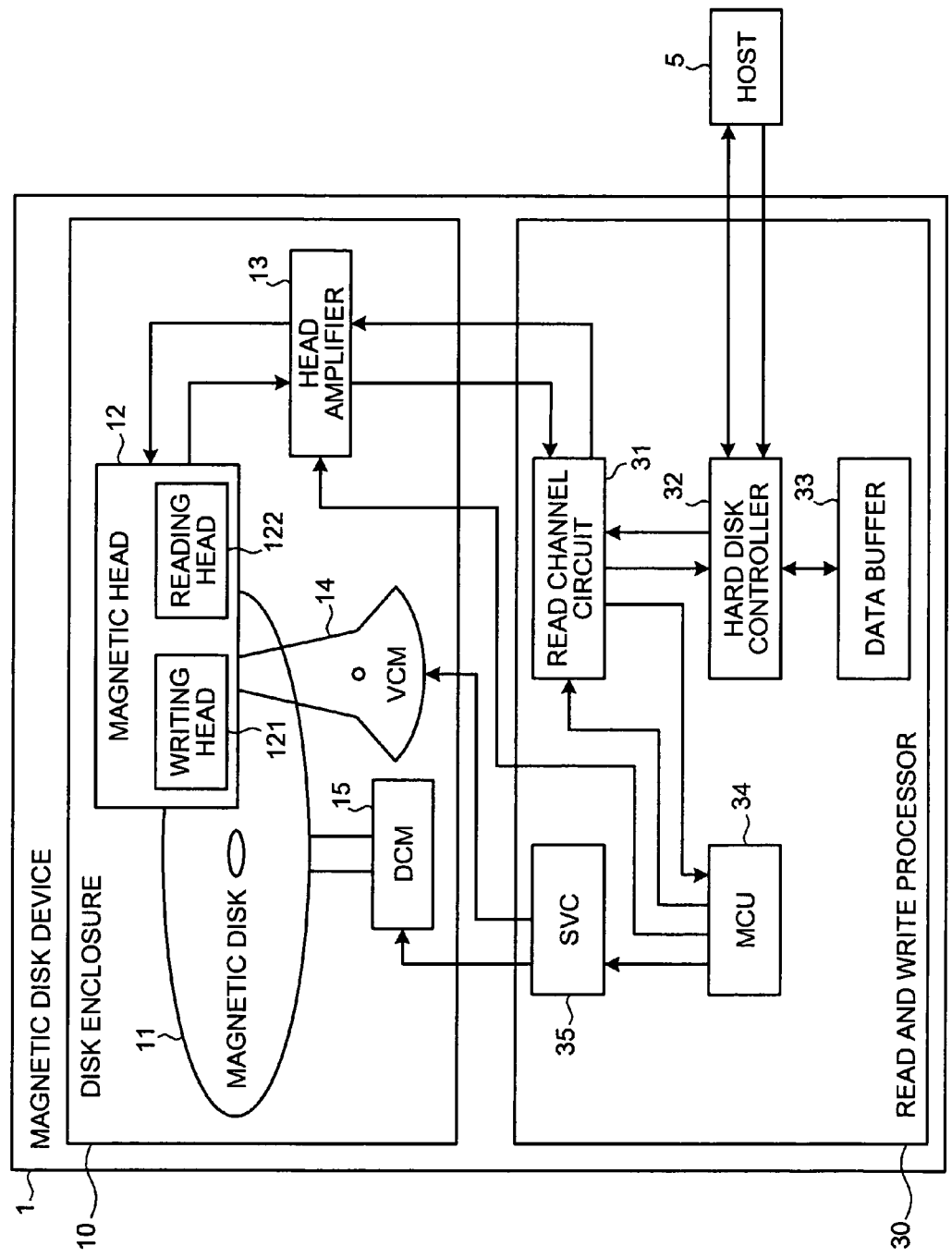
FIG. 8 is a block diagram of a magnetic disk device according to an embodiment of the present invention.

FIG. 8 is a block diagram of a magnetic disk device 1 according to an embodiment of the present invention. The magnetic disk device 1 shown in FIG. 8 is controlled by a host 5 that is an upper device such as a personal computer or a server using the magnetic disk device 1 as a storage device.

The magnetic disk device 1 includes a disk enclosure (DE) 10 and a read and write processor 30. The DE 10 includes a magnetic disk 11 that stores user data received from the host 5 for each data sector, a magnetic head 12 that includes a writing head 121 for recording data sectors in the magnetic disk 11 and a reading head 122 for reading data sectors recorded on the magnetic disk 11, a head amplifier 13 that controls a write current supplied to the writing head 121 and that amplifies a magnetization waveform of the reading head 122, a voice coil motor (VCM) 14 that controls a position of the magnetic head 12, and a direct current motor (DCM) 15 that rotates the magnetic disk 11. The read and write processor 30 includes a read channel circuit 31 that performs a predetermined coding processing on data recorded on the magnetic disk 11 and performs a predetermined decoding processing on data that is read from the magnetic disk 11, a hard disk controller 32 that performs a processing regarding the error correction, a data buffer 33 that stores data recorded on the magnetic disk 11 and data read from the magnetic disk 11, a micro controller unit (MCU) 34 that produces control information for controlling the DCM 15, the VCM 14, and the head amplifier 13, and a servo controller (SVC) 35 that controls the DCM 15 and the VCM 14 based upon control information produced by the MCU 34. While in FIG. 8, both the writing head 121 and the reading head 122 are provided in this embodiment, one head system can be employed when data is recorded on the magnetic disk 11 and the recorded data is read from the magnetic disk 11.

The DE 10 is shielded by a filter from outside to protect the magnetic disk 11 or the magnetic head 12 from dust or the like. Constituent parts or elements for the read and write processor 30 are packaged on a printed board (PCBA). The hard disk controller 32, the MCU 34, and the read channel circuit 31 may be embodied in one large scale integration (LSI) or they may be embodied in individual LSIs.

In the magnetic disk device 1, the magnetic head 12 is caused to float on a rotating magnetic disk 11, and the magnetic disk 11 is magnetized by the writing head 121 at writing, while magnetic signals are read from magnetization of the magnetic disk 11 by the reading head 122 at reading to reproduce the user data recorded on the magnetic disk 11.

Tracks on the magnetic disk 11 are classified to servo information that indicates a position of the writing head 121 or the reading head 122 and a data section on which the user data is stored. A serve signal read by the reading head 122 is decoded to position information by the read channel circuit 31, and the MCU 34 controls the VCM 14 via the SVC 35 to position the writing head 121 or the reading head 122 on the track accurately based upon the position information.

Upon receipt of a write instruction from the host 5, the hard disk controller 32 stores the user data received from the host 5 in the data buffer 33 together with the write instruction. The hard disk controller 32 calculates a physical track position on the magnetic disk 11 from a logical block address (LBA) included in the write instruction. The hard disk controller 32 outputs address information, which is the physical track position calculated, to the MCU 34.

The MCU 34 outputs, to the SVC 35, head position control information for moving the head to a position corresponding to a track number included in the address information. The SVC 35 determines a current for controlling the VCM 14 based upon the head position control information to move the VCM 14 and position the writing head 121 at a desired track on the magnetic disk 11.

On the other hand, the hard disk controller 32 reads the user data in the data buffer 33 to calculate the ECC. The hard disk controller 32 sets the user data to the user data section 62 in the data sector shown in FIG. 1, sets the address information to the CRC section 63, and sets the calculated ECC in the ECC section 64 to output the data sector to the read channel circuit 31.

The read channel circuit 31 sets information for setting phase synchronization to the PLL section 60 in the data sector shown in FIG. 1 and for fixing output and sets synchronization information on the SB section 61. The read channel circuit 31 performs a predetermined coding processing on the data sector to produce a write signal for recording on the magnetic disk 11. The read channel circuit 31 outputs the write signal to the head amplifier 13.

The head amplifier 13 changes a direction of a write current to be flowed in the writing head 121 based upon a bit of the write signal to change a direction of magnetization of the magnetic disk 1, thereby recording the user data received from the host 5 on the magnetic disk 11.

Upon receipt of a read instruction from the host 5, the hard disk controller 32 calculates the physical track position on the magnetic disk 11 from the LBA included in the read instruction. The hard disk controller 32 outputs address information, which is the physical track position calculated, to the MCU 34.

The MCU 34 outputs, to the SVC 35, head position control information for moving the head to a position corresponding to a track number of the address information. The SVC 35 determines a current for controlling the VCM 14 based upon the head position control information to move the VCM 14 and position the writing head 121 at a desired track on the magnetic disk 11.

The head amplifier 13 amplifies a magnetization waveform read from the magnetic disk 11 via the reading head 122 to produce a read signal. The head amplifier 13 outputs the read signal to the read channel circuit 31.

The read channel circuit 31 performs a predetermined decoding processing on the user data set in the user data sector 62, the address information set in the CRC section 63, and the ECC set in the ECC section 64 based upon the phase synchronization set in the PLL section 60 and the synchronization information set in the SB section 61 to perform conversion to non return to zero (NRZ) data. The read channel circuit 31 outputs the user data stored in the user data section 62 and the ECC stored in the ECC section 64 shown in FIG. 1 (hereinafter, the user data and the ECC are collectively called as data) of the NRZ data to the hard disk controller 32.

Figure 9:
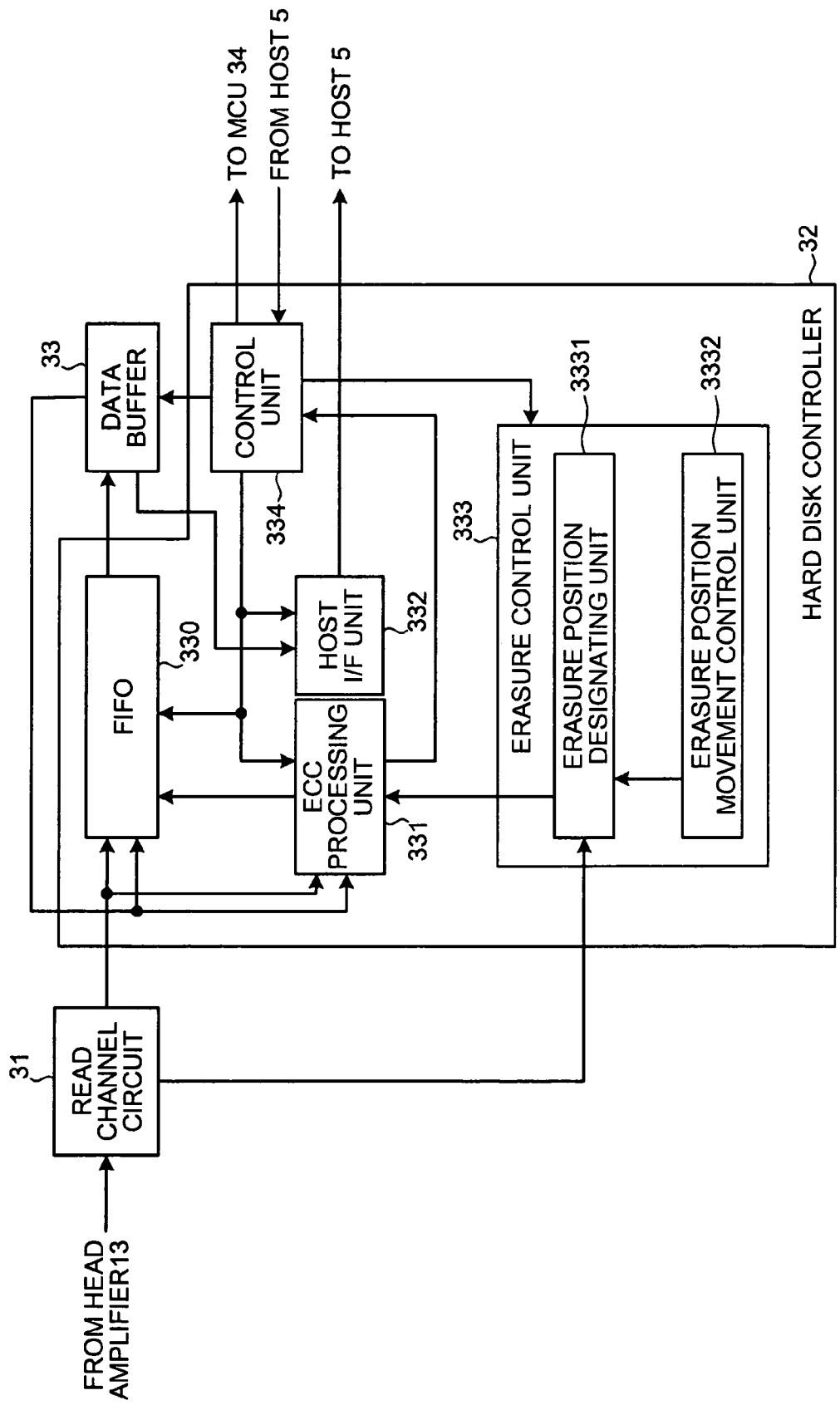
FIG. 9 is a block diagram of a hard disk controller shown in FIG. 8.

The hard disk controller 32 performs the ECC arithmetic processing on the data to determine whether there is an error in the data, and if there is any error, corrects the error. FIG. 9 is a block diagram of a hard disk controller 32 shown in FIG. 8. The hard disk controller 32 includes a first-in first-out (FIFO) 330, an ECC processing unit 331, a host interface (I/F) unit 332, an erasure control unit 333, and a control unit 334.

The control unit 334 integrally controls respective constituent elements of the hard disk controller 32 and determines an operation mode in the error correction, whether in the on-the-fly mode, in the erasure mode based upon the TA detecting signal, or in the erasure mode based upon the position movement correction. Control is performed to transfer the data from the FIFO 330 to the data buffer 33, or to transfer the data from the data buffer 33 to the FIFO 330 and the ECC processing unit 331 based on the operation mode and a processing completion notification that is notified from the ECC processing unit 331. The control unit 334 calculates a physical track position on the magnetic disk 11 from the LBA included in the read instruction from the host 5 to output the address information that is the calculated physical track position to the MCU 34.

The FIFO 330 is a register with a First-In First-Out constitution that stores the user data and the ECC having n pieces of symbols in the user data section 62 and the ECC section 64 shown in FIG. 1, and stores the NRZ data input from the reach channel circuit 31 by the control unit 334 or the data stored in the data buffer 33.

The erasure control unit 333 determines an erasure correcting position when the magnetic disk device operates in the erasure mode, and makes designation on the erasure correcting position to the ECC processing unit 331. The erasure control unit 333 is provided with an erasure position movement control unit 3332 and an erasure position designating unit 3331.

The erasure position movement control unit 3332 shifts an erasure start position with a predetermined symbol width when the magnetic disk operates in the erasure mode based on the position movement correction. The erasure position designating unit 3331 selects an erasure correcting position based upon the TA detecting signal input from the read channel circuit 31 to output the selected erasure correcting position to the ECC processing unit 331, when the magnetic disk device operates in the erasure mode based upon the TA detection.

The erasure position designating unit 3331 selects an erasure correcting position based upon the erasure start position and an erasure length that is input from the erasure position movement control unit 3332 to output the erasure correcting position selected to the ECC processing unit 331, when the magnetic disk device operates in the erasure mode based upon the position movement correction.

The ECC processing unit 331 performs the error correction by the ECC arithmetic processing on data input from the read channel circuit 31 or data input from the data buffer 33. In the erasure mode based upon the position movement correction, the ECC processing unit 331 performs the ECC arithmetic processing on the data input from the data buffer 33. When there is an error in the data at the erasure correcting position designated from the erasure position designated unit 3331, the ECC processing unit 331 corrects the data and corrects the data in the FIFO 330 corresponding to the corrected data.

In the erasure mode based upon the TA detection, the ECC processing unit 331 performs the ECC arithmetic processing on the data input from the read channel circuit 31, and, when there is an error in the data, identifies a position of the error to correct the data and corrects the data in the FIFO 330 corresponding to the data corrected.

In the on-the-fly mode, the ECC processing unit 331 performs the ECC arithmetic processing on the data input from the data buffer 33, and when there is an error in the data, identifies a position of the error to correct the data and corrects the data in the FIFO 330 corresponding to the data corrected.

When there is no error in the data or when the data has been corrected, the ECC processing unit 331 notifies the control unit 334 that the data is normal by sending a processing completion notification that indicates that the data is normal. However, when the error in the data has not been corrected, the ECC processing unit 331 notifies the control unit 334 that the error is a read error by sending a processing completion notification that indicates that the error is a read error.

The host I/F unit 332 outputs the data in the data buffer 33 in accordance with an instruction from the control unit 334.

The control unit 334 is preliminarily set with parameters required at reading, such as a maximum number of the error correction to be retried when a data error occurs at reading from the magnetic disk 11, a retry operation mode corresponding to the number of the error correction to be retried (for example, the magnetic disk device operates the error correction in the on-the-fly mode for the error correction from the first to the fifth retry, operates the error correction in the erasure mode based upon the TA detection from the sixth to tenth retry, performs an offset read that shifts the reading head 122 at the eleventh retry, performs in the erasure mode based upon the position movement correction at the fifteenth retry), the number of erasure position moving steps indicating the number of symbols by which the erasure start position in the erasure mode based upon the position movement correction should be shifted, or the erasure length indicating the number of symbols to be error-corrected in the erasure mode based upon the position movement correction. The parameters may be set from outside of the magnetic disk device 1.

Figure 10A:
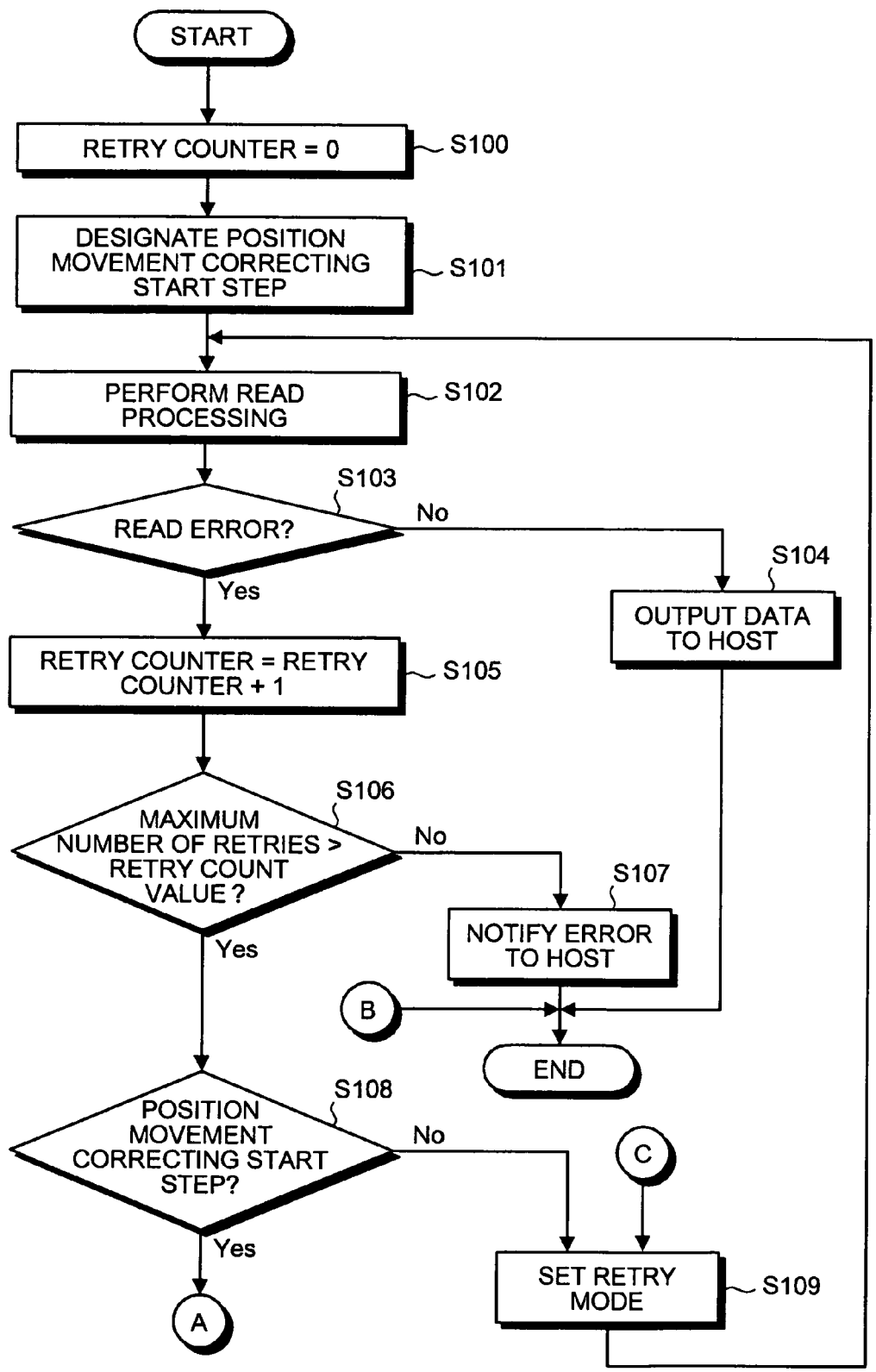
FIG. 10A is a flowchart of an operation of a magnetic disk device according to a first embodiment of the present invention.

Upon receipt of a read instruction from the host 5, the control unit 334 initializes a retry counter (0) that counts the number of retries of reading the data recorded on the magnetic disk 11 (step S100 in FIG. 10A). The control unit 334 indicates the value of the number of retries actuating the erasure mode based upon the position movement correction (step S101 in FIG. 10A). The control unit 334 selects the error correction mode based upon a retry operation mode corresponding to the number of retries and sets the error correction mode selected in the ECC processing unit 331. When first reading data from the magnetic disk 11 upon receipt of the read instruction, the magnetic disk device 1 ordinarily operates in the on-the-fly mode, but it may operate in the erasure mode based upon the TA detection.

The control unit 334 calculates a physical track position on the magnetic disk device 11 from the LBA included in the read instruction to output address information, which is the physical track position, to the MCU 34 and performs a read processing (step S102 in FIG. 10A). Specifically, the MCU 34 outputs, to the SVC 35, position control information for moving the head to a position corresponding to a track number in the address information input from the control unit 334 in the hard disk controller 32 and the SVC 35 determines a current for controlling the VCM 14 based upon the head position control information to move the VCM 14 to position the reading head 122 to a desired track on the magnetic disk 11. The head amplifier 13 outputs, to the read channel circuit 31, a read signal obtained by amplifying magnetization waveform output from the magnetic disk 11 via the reading head 122, and the read channel circuit 31 performs a predetermined decoding processing on user data set in the user data section 62, address information set in the CRC section 63, and ECC set in the ECC section 64 based upon phase synchronization set in the PLL section 60 and synchronization information set in the SB section 61 to perform conversion to the NRZ data. The read channel circuit 31 outputs the data (user data and ECC) that have been converted into the NRZ data to the FIFO 330 and the ECC processing unit 331. The read channel circuit 31 asserts the TA detecting signal when a level of the read signal exceeds the TA slice level 70. The ECC processing unit 331 performs the error correction by the ECC arithmetic processing on the data input from the read channel circuit 31. When there is an error in the data, the ECC processing unit 331 corrects the data in the error correction mode designated (the on-the-fly mode or the erasure mode based upon the TA correction) to correct data in the FIFO 330 corresponding to the corrected data. When the TA detecting signal from the read channel circuit 31 is asserted, the erasure position designating unit 3331 selects an erasure correcting position based upon a symbol position where the TA detecting signal is asserted to output the selected erasure correcting position to the ECC processing unit 331, and the ECC processing unit 331 performs the error correction in the erasure mode based upon the erasure correcting position. When there is no error in the data, or when the data has been corrected, the ECC processing unit 331 notifies the control unit 334a that the data is normal by sending the processing completion notification that indicates that the data is normal. When the error in the data has not been corrected, the ECC processing unit 331 notifies the control unit 334 that the error is a read error by sending the processing completion notification that indicates that the error is a read error.

The control unit 334 determines whether the error is the read error based upon the processing completion notification (step S103 in FIG. 10A). When the error is not the read error, the control unit 334 stores the data in the data buffer 33. The control unit 334 outputs the data stored in the data buffer 33 to the host 5 via the host I/F unit 332 to complete the processing (step S104 in FIG. 10A).

When the error is the read error, the control unit 334 increments the retry counter (step S104 in FIG. 10A). The control unit 334 compares the predetermined maximum number of retries and a retry count value in the retry counter with each other (step S106 in FIG. 10A). When the retry count value is equal to or more than the predetermined maximum number, the control unit 334 notifies such a fact that the error is the read error to the host 5 to complete the processing (step S107 in FIG. 10A).

When the retry count value is smaller than the predetermined maximum number, the control unit 334 determines whether the retry count value indicates a position movement correcting start step (step S108 in FIG. 10A). When the retry count value does not indicate the position movement correcting start step (when the retry count value is different from the position movement correcting start step), the control unit 334 selects an error correcting mode based upon the retry operation mode corresponding to the number of retries, and sets the selected error correcting mode in the ECC processing unit 331 and sets a retry mode such as an offset read mode (step S109 in FIG. 10A). The control unit 334 repeats the steps of performing a read processing based on the set retry mode, determining whether data read from the magnetic disk is the read error, outputting the data to the host 5 when the data is not the read error, and setting the retry mode when the error is the read error until the retry count value in the retry counter reaches the position movement correcting start step (steps S102 to S109 in FIG. 10A).

When the retry count value indicates the position movement correcting start step (the retry count value is equal to the position movement correcting start step), the control unit 334 stores the data in the data buffer 33 (step S110 in FIG. 10A). The control unit 334 outputs a position movement correcting start instruction indicating that the magnetic disk device 1 operates in the erasure mode based upon the position movement correction to the erasure position designating unit 3331 and the erasure position movement control unit 3332. At that time, the control unit 334 notifies an erasure length to the erasure position designating unit 3331 and notifies the erasure length and a position moving step to the erasure position movement control unit 3332 (step S111 in FIG. 10B). Upon receipt of the position movement correcting start instruction, the erasure position movement control unit 3332 initializes the erasure start position (1) (step S112 in FIG. 10B).

The control unit 334 controls the data buffer 33, the FIFO 330, and the ECC processing unit 331 to transfer data stored in the data buffer 33 to the FIFO 330 and the ECC processing unit 331 (step S113 in FIG. 10B).

The erasure position movement control unit 3332 outputs the erasure position start position to the erasure position designating unit 3331. The erasure position designating unit 3331 selects an erasure correcting position based upon the erasure start position and the erasure length to output the same to the ECC processing unit 331 (step S114 in FIG. 10B).

The ECC processing unit 331 performs the error correction by the ECC arithmetic processing on data transferred from the data buffer 33 (step S115 in FIG. 10B). Specifically, the ECC processing unit 331 performs the ECC arithmetic processing on the data. When there is a data error in an erasure correcting position input from the erasure position designating unit 3331, the ECC processing unit 331 performs the error correction on the data in the FIFO 330 corresponding to the data corrected. When there is no error in the erasure correcting position or when the error has been corrected, the ECC processing unit 331 notifies the control unit 334 that the data is normal by sending the processing completion notification including that the data is normal. When the error in the data has not been corrected, the ECC processing unit 331 notifies the control unit 334 that correction is impossible by sending another processing completion notification including that correction is impossible.

The control unit 334 determines whether the data has been corrected based upon the processing completion notification (step S116 in FIG. 10B). When the data has been corrected (when the processing completion notification including that the data is normal), the control unit 334 stores the data stored in the data buffer 33 and outputs the data stored to the host 5 via the host I/F unit 332 to terminate the processing (step S117 in FIG. 10B).

When the data has not been corrected (when the processing completion notification including that correction is impossible), the control unit 334 notifies that the error correction in the erasure mode based upon the position movement correction continues.

The erasure position movement control unit 3332 determines whether the erasure mode based upon the position movement correction has been performed on entire data (step S118 in FIG. 10B). Specifically, the erasure position movement control unit 3332 utilizes a value obtained by subtracting the erasure length from the number of symbols in the data (data length) as a termination determining value to compare the termination determining value and a symbol value indicating a current erasure start position with each other. When the symbol value indicating the current erasure start position is equal to or less than the termination determining value, the erasure position movement control unit 3332 determines that there is unprocessed data. When the symbol value indicating the current erasure start position exceeds the termination determining value, the erasure position movement control unit 3332 determines that the erasure mode based upon the position movement correction has been performed on the entire data.

When it is determined that there is unprocessed data, the erasure position movement control unit 3332 calculates a new erasure start position by adding the erasure moving step to the symbol value indicated by the current erasure start position (step S119 in FIG. 10B). The erasure position movement control unit 3332 outputs the erasure start position calculated to the erasure position designating unit 3331, the control unit 334 stores the data stored in the data buffer 33, the erasure position designating unit 3331 selects an erasure correcting position based upon the erasure start position and the erasure length, the ECC processing unit 331 repeats an operation for performing the error correction in the ECC arithmetic processing on the data transferred from the data buffer 33 until the data has been corrected or the erasure mode based upon the position movement correction has been performed on entire data (steps S113 to S119 in FIG. 10B).

When the error correction on the data has not been completed even if the erasure mode based upon the position movement correction has been performed on all the data, the control unit 334 selects the error correcting mode based upon the retry operation mode corresponding to the number of retries, sets the selected error correcting mode in the ECC processing unit 331 and sets the retry mode such as the offset read, and repeats the above operations (steps S102 to S109 in FIG. 10A, and step S110 to S119 in FIG. 10B) until the data can be read correctly or the number of retries reaches the maximum number of retires. Thereby, the control unit 334 outputs the data to the host 5, when the data can be finally read correctly, while notifying a read error to the host 5 to terminate the processing according to the read instruction to the host 5, when the data can not be read correctly even if the retry is repeated up to the maximum number of retries.

FIG. 7 is a schematic for explaining a procedure of shifting a position at which erasure correction is performed when the erasure length is "4" and an erasure moving step is "1". When the magnetic disk device 1 becomes an erasure mode based upon the position movement correction, the erasure position movement control unit 3332 sequentially updates an erasure start position from the initial value at erasure moving step intervals, such as from the first symbol, the second symbol, the third symbol, . . . , and the eleventh symbol, and the erasure position designating unit 3331 shifts the erasure correcting position such as from the first to fourth symbols; the second to fifth symbols; the third to seventh symbols; . . . , and the eleventh to the fourteenth symbols. Since errors occur in the twelfth to fourteenth symbols due to the medium failure, when the erasure correcting position reaches the eleventh to fourteenth symbols, the error correction performed by the ECC processing unit 331 is made possible.

In the first embodiment, the control unit 334 transfers data stored in the FIFO 330 and read from the magnetic disk 11 to the data buffer 33 in this manner. The erasure position movement control unit 3332 shifts the erasure start position from the predetermined initial value at predetermined erasure moving step intervals, and the erasure position designating unit 3331 determines an erasure correcting position based upon the erasure start position and the predetermined erasure length. The ECC processing unit 331 performs the error correction by the ECC arithmetic processing on the data in the data buffer 33 in the erasure mode. Therefore, even if an error position in the data can not be identified, it is unnecessary to read the data from the magnetic disk 11 for each retry, so that the error correction can be performed in the erasure mode with a reduced time.

Specifically, when an erasure correcting position is sequentially shifted for each symbol in the user data and the ECC constituted of n pieces of symbols, it is necessary to read the data from the magnetic disk 11 at most (n−erasure length+1) times in the conventional technology. According to the first embodiment, it is only necessary to read the data from the magnetic disk 11 for once. Accordingly, a time required for the error correction can be reduced.

The first embodiment is constituted to use all the ECCs in the erasure mode based upon the position movement correction and designate an erasure designating position within a range of the number of symbols in the ECC to perform the error correction. However, data errors re not be limited to a case in which they occur continuously in the data. When errors occur at random in addition to errors due to the medium failure, even if the number of errors is within the number of errors that is correctable, error correction can not be performed by the magnetic disk device 1 according to the first embodiment in which the erasure designating position is designated within the range of the number of symbols in the ECC, unless the range of erasure designating position covers the positions of all errors.

To improve such a problem, the magnetic disk device 1 according to a second embodiment is constituted to allocate the ECC to the erasure mode based upon the position movement correction and the on-the-fly mode to perform the error correction.

A constitution of the magnetic disk device 1 according to the second embodiment of the present invention has the same as that in the magnetic disk device 1 according to the first embodiment shown in FIG. 8, and explanation thereof is omitted. A difference between the first embodiment and the second embodiment lies in that, when the ECC processing unit 331 performs the error correction in the erasure mode based upon the position movement correction, the error correction in the on-the-fly mode is performed with the number of symbols obtained by subtracting the number of symbols in an erasure correcting position input from the erasure position designating unit 3331 from the number of symbols included in ECC.

Figure 11:
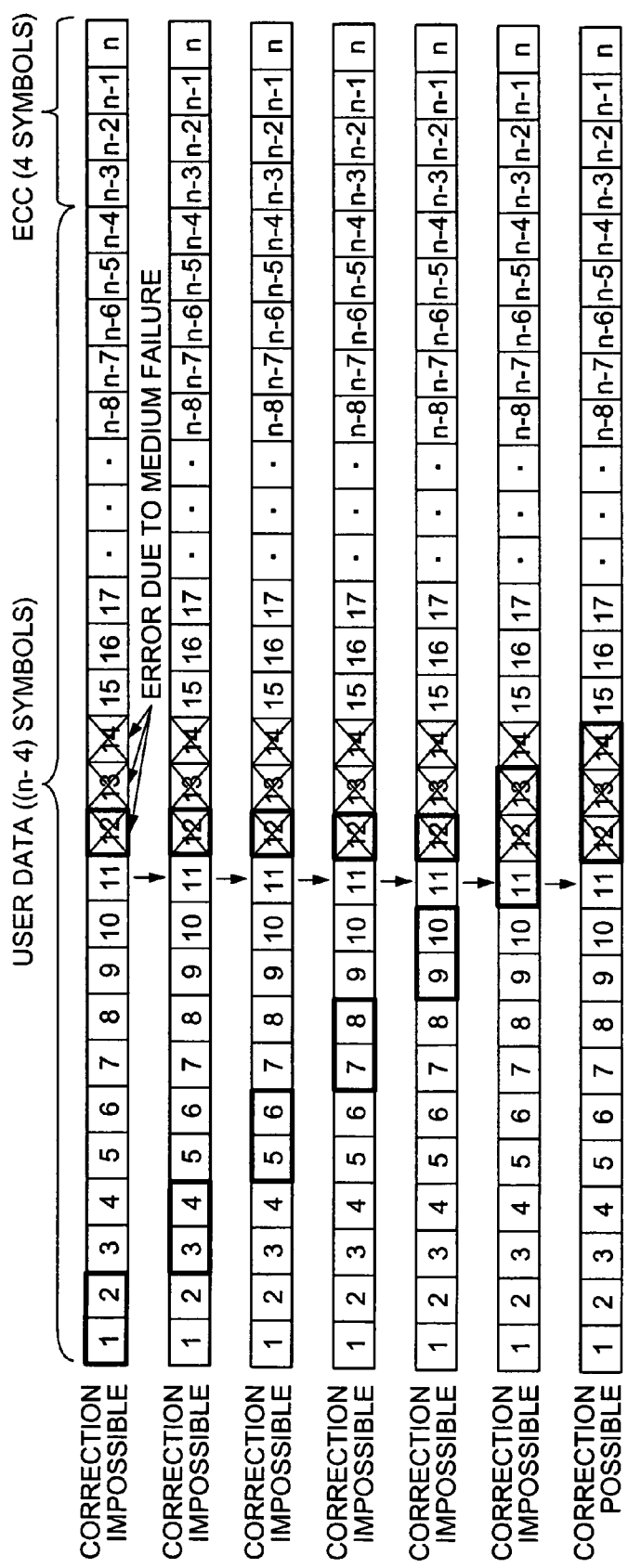
FIG. 11 is a schematic of a procedure of shifting the position at which the erasure correction is performed.
Figure 12:
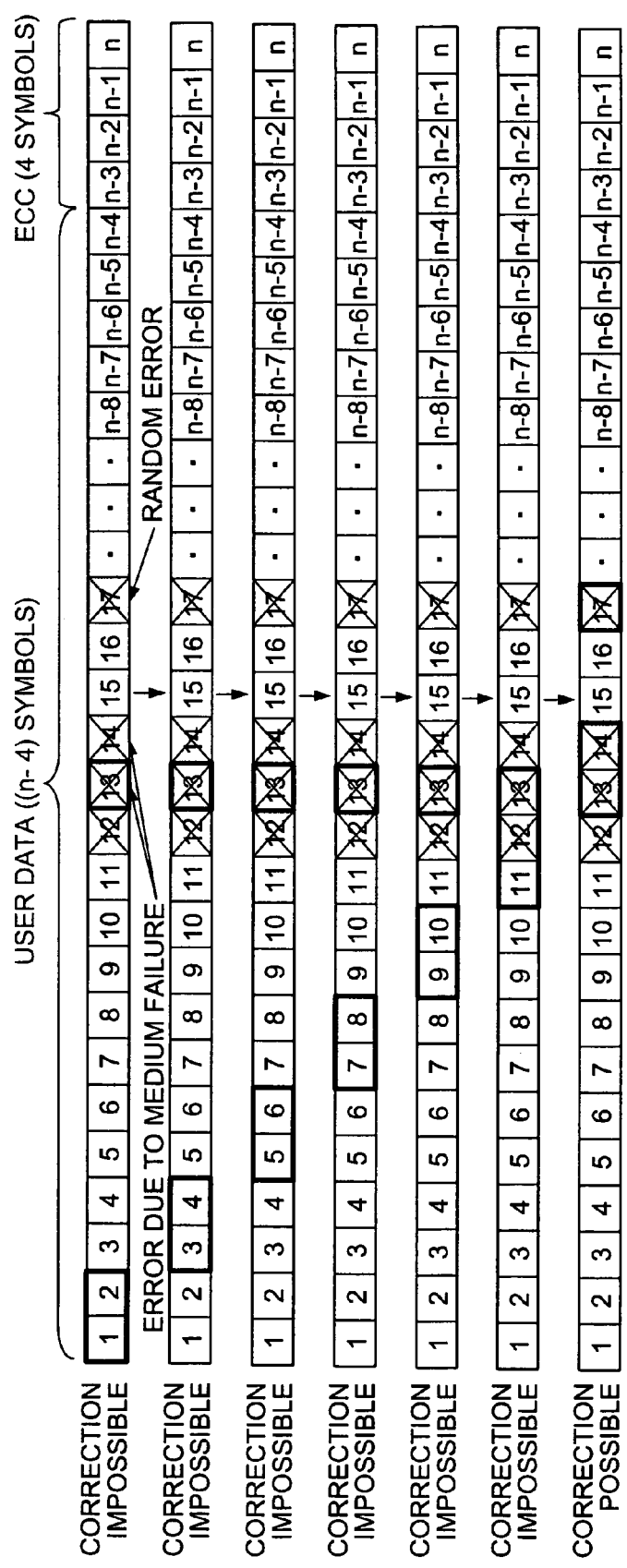
FIG. 12 is a schematic of a procedure of shifting the position at which the erasure correction is performed.

FIGS. 11 and 12 are diagrams of a case that the erasure length is "2", the erasure moving step interval is "2", two symbols in ECC constituted of four symbols are allocated to the erasure mode based upon the position movement correction, and the remaining two symbols are allocated to the on-the-fly mode. In that case, the error correction of three symbols can be performed by the ECC processing unit 331.

In the erasure mode based upon the position movement correction, the erasure position movement control unit 3332 shifts an erasure start position from an initial value at erasure moving step intervals (for each two symbols) such as from the first symbol to the third symbol, the fifth symbol, . . . , and the thirteenth symbol, and the erasure position designating unit 3331 shifts an erasure correcting position such as from the first and second symbols to the third and fourth symbols, the fifth and sixth symbols, . . . , and the thirteenth and fourteenth symbols.

When the erasure correcting position is either of the first and second symbols, the third and fourth symbols, the fifth and sixth symbols, the seventh and eighth symbols, and the ninth and tenth symbols, symbols in which an error occurs is out of the range of the erasure correcting position. Therefore, even if data of the twelfth symbol is set to an object to be error-corrected in the on-the-fly mode, since there are errors in the thirteenth and fourteenth symbols, the ECC processing unit 331 can not correct data.

When the erasure position designation (the erasure correcting position) is directed to the eleventh and twelfth symbols, even if the thirteenth symbol is set to an object to be error-corrected in the on-the-fly mode, since there is an error in the fourteenth symbol, the ECC processing unit 331 can not correct data. However, when the erasure position designation is directed to the thirteenth and fourteenth symbols, the thirteenth and fourteenth symbols where an error occurs are within the range of the erasure position designation. Therefore, when the twelfth symbol is set to an object to be error-corrected in the on-the-fly mode, in the twelfth to fourteenth symbols where an error occurs are set to an object to be error-corrected, the ECC processing unit 331 can correct data.

In FIG. 12, errors due to the medium failure occur in the thirteenth and fourteenth symbols, and a random error occurs in the seventeenth symbol. The erasure position movement control unit 3332 shifts an erasure start position from an initial value at erasure moving step intervals (for each two symbols) such as from the first symbol to the third symbol, the fifth symbol, . . . , and the thirteenth symbol, and the erasure position designating unit 3331 updates an erasure correcting position such as from the first and second symbols to the third and fourth symbols, the fifth and sixth symbols, . . . , and the thirteenth and fourteenth symbols.

When the erasure correcting position is directed to either of the first and second symbols, the third and fourth symbols, the fifth and sixth symbols, the seventh and eighth symbols, the ninth and tenth symbols, and the eleventh and twelfth symbols, symbols where an error occurs is out of the range of the erasure correcting position. Therefore, even if the data of the thirteenth symbol is set to an object to be error-corrected in the on-the-fly mode, since there are errors in the fourteenth and seventeenth symbols, the ECC processing unit 331 can not correct data.

When the erasure position designation is directed to the thirteenth and fourteenth symbols, the thirteenth and fourteenth symbol where an error occurs are within the range of the erasure position designation. Therefore, when the seventeenth symbol is an object to be error-corrected in the on-the-fly mode, the thirteenth, fourteenth, and seventeenth symbols where an error occurs is set to an object to be error-corrected, so that the ECC processing unit 331 can correct data.

Thus, since the second embodiment is constituted to allocate the number of symbols in the ECC to the on-the-fly mode and the erasure mode based upon the position movement correction and perform the error correction by the ECC arithmetic processing in the on-the-fly mode and the erasure mode based upon the position movement correction, an error correcting capability thereof lowers as compared with the case of applying the erasure mode based upon the position movement correction to all symbols in the ECC, but even if discontinuous data errors including an error out of the range of the erasure correcting position occur, the embodiment can correct data and can perform the error correction efficiently.

In the second embodiment, since the ECC is constituted of four symbols, two symbols in the ECC are allocated to each of the on-the-fly mode and the erasure mode based upon the position movement correction, but the number of symbols to be allocated to the on-the-fly mode and the erasure mode based upon the position movement correction is not limited to the number of symbols in the embodiment and any symbol allocation will be applied to the present invention.

In the second embodiment, since symbols in the ECC are allocated to the on-the-fly mode and the erasure mode based upon the position movement correction and the error correction is performed, even if there is an error(s) at random in addition to errors due to the medium failure, data can be corrected. However, since the on-the-fly mode requires the ECC of two symbols to one symbol, a correcting capability lowers as compared with the case of using all ECC in the erasure mode.

To improve such a problem, a magnetic disk device 1 according to a third embodiment is constituted to perform a plurality of erasure position designations in the erasure mode based upon the position movement correction to correct errors occurring at random.

A constitution of the magnetic disk device 1 according to the third embodiment of the present invention has the same as that in the magnetic disk device 1 according to the first embodiment shown in FIG. 8, and explanation thereof is omitted. A difference between the first embodiment and the third embodiment lies in that the erasure position movement control unit 3332 outputs a plurality of erasure start positions to the erasure position designating unit 3331, the erasure position designating unit 3331 selects a plurality of erasure correcting positions based upon the erasure start positions and erasure length corresponding to the respective erasure start positions to output them to the ECC processing unit 331, and the ECC processing unit 331 performs the error corrections at the erasure correcting positions.

As regards an erasure position designation of the third embodiment according to the present invention, an example where the number of erasure position designations is "2", an erasure moving step interval in the first erasure position designation is "0" (the erasure position is fixed), an erasure moving step interval in the second erasure position designation is "2", and the first and the second erasure lengths are "2" will be explained with reference to FIG. 13.

Figure 13:
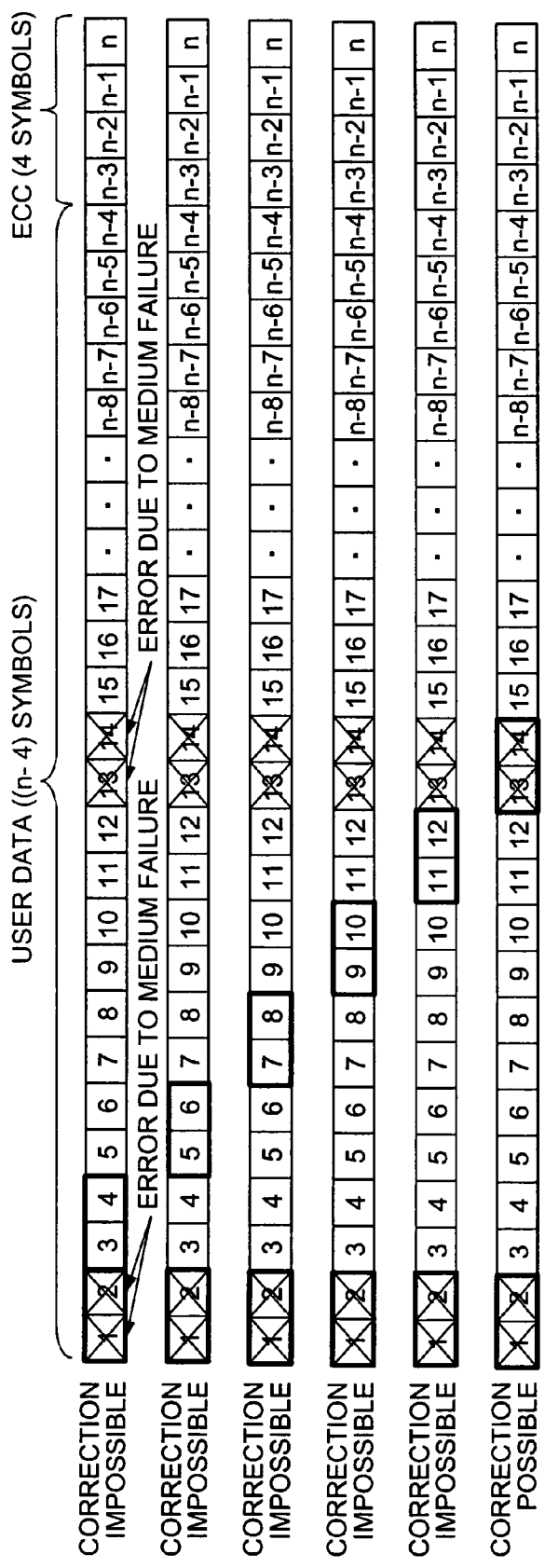
FIG. 13 is a schematic of a procedure of shifting the position at which the erasure correction is performed.

In the example shown in FIG. 13, errors occur in the first, the second, the thirteenth, and the fourteenth symbols due to the medium failure. The erasure position movement control unit 3332 fixes the first erasure start position at the first symbol, shifts the second erasure start position such as from the third symbol to the fifth symbol, the seventh symbol, . . . , and the thirteenth symbol. The erasure position designating unit 3331 sets the first erasure correcting position to a first and second symbols, and shifts the erasure position to a second erasure correcting position such as from the third and fourth symbols to the fifth and sixth symbols, the seventh and eighth symbols, . . . , and the thirteenth and fourteenth symbols.

When the first erasure correcting position is directed to the first and second symbols, and the second erasure correcting position is directed to either of the third and fourth symbols, the fifth and sixth symbols, the seventh and eighth symbols, the ninth and tenth symbols, and the eleventh and twelfth symbols, the first and second symbols where an error occurs is within the range of the first erasure correcting position, but the thirteenth and fourteenth symbols where an error occurs is out of the ranges of the first and the second erasure correcting positions, so that the ECC processing unit 331 can not correct data.

When the first erasure correcting position is directed to the first and second symbols, and the second erasure correcting position is directed to the thirteenth and fourteenth symbols, all the first, the second, the thirteenth, and the fourteenth symbols where an error occurs are within the ranges of the first and the second erasure correcting positions, so that the ECC processing unit 331 can correct data.

In the third embodiment, since the plurality of erasure correcting positions are provided and respective erasure correcting positions are changed, the error correction can be performed on data errors occurring discontinuously in data in the erasure mode.

In the third embodiment, the case that the first erasure correcting position is fixed and the second erasure correcting position is moved has been explained, but the present invention is not limited to this case, where the first and second erasure correcting positions can be moved to any positions.

While in the third embodiment, a case in which the number of erasure correcting positions is "2" has been explained, the number of erasure correcting positions is not limited to this number. For example, when the ECC is constituted of four symbols, at most four erasure correcting positions can be provided by setting an erasure length of each erasure correcting position to one symbol. That is, increase in the number of divisions to the erasure correcting position becomes more effective to data errors occurring at random. The ECC of two symbols is required for correcting a data error of one symbol in the on-the-fly mode, but the error correction of at most four symbols can be made possible and reliability of the data can be improved in this constitution.

While in the third embodiment, a case that the magnetic disk device 1 operates in only the erasure mode based upon the position movement correction has been explained, the magnetic disk device can be constituted to perform the error correction by the ECC arithmetic processing with a combination of the erasure mode based upon the position movement correction according to the third embodiment and the on-the-fly mode.

While in the first to third embodiments, the case that the ECC is constituted of four symbols has been explained, the number of symbols in the ECC is not limited to the above number. The magnetic disk device using a magnetic disk as the recording medium has been explained in the embodiments. However, the recording medium is not limited to the magnetic disk in any device that performs the error correction on data in the recording information stored in the recording medium by the ECC arithmetic processing.

According to the present invention, it is possible to shorten a time required for error correction in the erasure mode.

Moreover, according to the present invention, it is possible to correct not only data errors occurring continuously but also data errors occurring at random.

Furthermore, according to the present invention, it is possible to perform the error correction in the erasure mode even for data error occurring at random.

Moreover, according to the present invention, even if an error position on data can not be identified, the error correction can be performed in the erasure mode.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information storage device that reads data, the data including user data and an error correcting code (ECC) that is used for error correction in which an error in the data is corrected, from a recording medium, that performs the error correction on the data by an ECC arithmetic processing, and that retries the error correction when the error is not successfully corrected by the ECC arithmetic processing, comprising:
    a first buffer that stores the data read from the recording medium;
    a second buffer that stores the data stored in the first buffer;
    an erasure control unit that selects, at each time of retry of the error correction, an erasure correcting position at which erasure correction is carried out in the data by the ECC arithmetic processing;
    an ECC processing unit that performs the error correction by performing the ECC arithmetic processing on the data in the first buffer in an erasure mode at the position selected, and performs correction to the data in the second buffer in a same manner as the data in the first buffer; and
    a control unit that transfers the data in the first buffer to the second buffer and the ECC processing unit when the data is not corrected by the ECC processing unit.

2. The information storage device according to claim 1, wherein the data includes a plurality of symbols,
    the erasure control unit selects a range that includes a smaller number of symbols than a maximum number of symbols that is possible to be corrected by the ECC as an erasure correcting position, and
    the ECC processing unit performs the error correction on the data in the first buffer in the erasure mode based on the erasure correcting position and in an on-the-fly mode in which the error correction is performed based on a position of the error that is detected.

3. The information storage device according to claim 1, wherein the erasure control unit selects a plurality of erasure correcting positions at one time.

4. The information storage device according to claim 1, wherein the erasure control unit includes
    a position control unit that shifts a start position from which erasure is started at predetermined intervals from a predetermined initial value; and
    a position selecting unit that selects the erasure correcting position based on the start position and a predetermined number of symbols in the data.

5. The information storage device according to claim 1, wherein the recording medium is a magnetic disk.

* * * * *